United States Patent [19]

Hushower et al.

[11] 4,076,096

[45] Feb. 28, 1978

[54] HYDRAULIC STEERING SYSTEM

[75] Inventors: Richard R. Hushower, Benton Harbor; George M. Daresh, St. Joseph, both of Mich.

[73] Assignee: Clark Equipment Company, Buchanan, Mich.

[21] Appl. No.: 744,555

[22] Filed: Nov. 24, 1976

[51] Int. Cl.² .............................................. B62D 5/06
[52] U.S. Cl. ..................................... 180/133; 60/404; 60/418
[58] Field of Search .................. 180/132, 133; 60/405, 60/404, 403, 418, 413

[56] References Cited

U.S. PATENT DOCUMENTS

| | | | |
|---|---|---|---|
| 3,123,174 | 3/1964 | Bednar et al. | 180/133 |
| 3,439,768 | 4/1969 | Medley | 180/133 |
| 3,719,249 | 3/1973 | Becker et al. | 180/133 |
| 3,851,721 | 12/1974 | Comer et al. | 180/133 |
| 3,905,438 | 9/1975 | Runyon et al. | 180/133 |
| 3,935,918 | 2/1976 | Hicks et al. | 60/405 X |

FOREIGN PATENT DOCUMENTS 2,319,135  10/1974  Germany ............................. 180/133

Primary Examiner—Joseph F. Peters, Jr.
Assistant Examiner—John A. Pekar
Attorney, Agent, or Firm—Kenneth C. Witt

[57] ABSTRACT

A steering system for a vehicle having a hydraulic steering mechanism, and including an accumulator for maintaining a supply of pressurized hydraulic fluid to the steering mechanism. The hydraulic fluid for the steering mechanism is supplied in some circumstances by a hydraulic pump which operates only when the vehicle is moving. Two valves are connected in series and arranged to discharge the accumulator when both valves are open, one of the valves arranged to be opened when the engine stops and the other arranged to be opened when the vehicle driven pump stops.

5 Claims, 2 Drawing Figures

HYDRAULIC STEERING SYSTEM

The Government has rights in this invention pursuant to Contract No. DAAEO-7-75-C-0051 awarded by the Department of Defense.

BACKGROUND OF THE INVENTION

1. Field of the Invention

This invention relates to hydraulic steering systems suitable particularly for large vehicles such as off-the-road construction and earth moving machinery although it is adaptable to vehicles of smaller size.

2. Description of the Prior Art

It is known to utilize two pumps to provide hydraulic fluid for the operation of a vehicle hydraulic steering system and to include an accumulator in the hydraulic circuit to assist in maintaining a relatively constant hydraulic pressure. The use of two pumps minimizes the possibility of failure or malfunction of the hydraulic steering system if one of the pumps fails or ceases to operate for any reason. One of the pumps may supply the hydraulic system normally with the other arranged to be connected actively into the system only when the first pump fails, or it is possible for both of the pumps to supply the hydraulic system jointly under normal conditions with either serving as an emergency pump if the other fails. It is common for one of the pumps to be driven by the engine of the vehicle and the other to be operated responsively to motion of the vehicle, for example, through an output element of the vehicle transmission.

It is known in the prior art to provide for deactivating such a steering system by draining or discharging the accumulator when the vehicle engine is turned off and thus depressurizing the steering system. However, with such an arrangement it is possible to deactivate the steering system and thus make it impossible to steer the vehicle even though the vehicle may be still moving. Moreover, in a hydraulic system embodying an accumulator the hydraulic pressure necessary to actuate the steering mechanism may be retained for a considerable time after the pump or pumps are stopped, and this is undesirable because it would allow the steering mechanism to be moved after operation of the vehicle had ceased and when maintenance or other activities were taking place with the resultant possibility of personal injury or property damage because of movement of parts of the vehicle. The object of the present invention is to overcome these deficiencies.

SUMMARY OF THE INVENTION

In one preferred form of our invention we provide a steering system for a vehicle with a hydraulic steering mechanism which includes an accumulator connected to maintain a supply of pressurized hydraulic fluid to the steering mechanism. There are two pumps, one driven by the engine and another for emergency use which operates only when the vehicle is moving. Two valves are connected in series and arranged to discharge the accumulator when both valves are open. One of the valves is arranged to be opened when the engine driven pump stops and the other valve is arranged to be opened when the other pump stops.

DESCRIPTION OF THE PREFERRED EMBODIMENT

Figure 1:
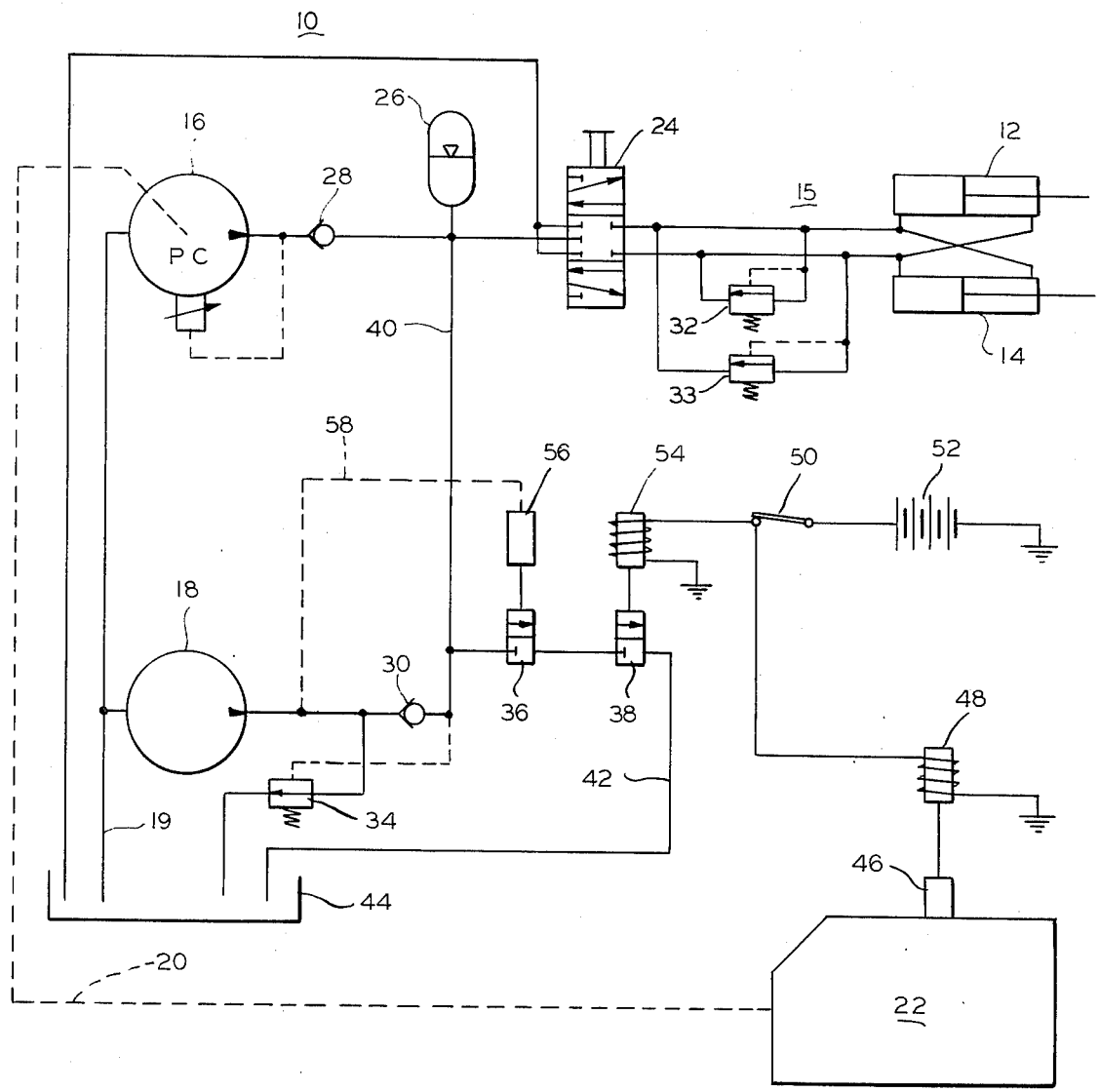
FIG. 1 is a diagrammatic illustration of the hydraulic system of the invention showing all parts in the operating condition.

The hydraulic steering system of the present invention, which is indicated generally by the numeral 10 in FIG. 1 of the drawing, can be used for various vehicles. However, the invention is described and illustrated herein in a form which is applicable to an articulated vehicle as disclosed and claimed in U.S. Pat. No. 3,889,976 Jesswein, dated June 17, 1975.

The articulated vehicle of said patent includes two double acting linear hydraulic actuators or jacks which are operated hydraulically in push-pull relation to steer the articulated vehicle. Similar actuators are indicated at 12 and 14 in FIG. 1 of the drawing of the present invention.

In carrying out the present invention two hydraulic pumps are provided and these are indicated by the identifying numerals 16 and 18 respectively. Both withdraw hydraulic fluid from reservoir 44 through conduit 19. As indicated by the dashed line 20, pump 16 is driven by an engine 22 which propels the vehicle on which the present invention is used.

Pump 18 is a so-called wheel driven or ground driven pump, meaning that it operates only when the vehicle is in motion. It may, for example, be driven by an output element of the vehicle transmission, or it may be driven by some other portion of the vehicle drive line which is in motion when the vehicle is in motion and stops when the vehicle stops. Pump 18 is fully reversible in operation so that the pump delivers fluid which is available to the steering system regardless of the direction of vehicle motion.

The pump 16 in the system disclosed is a variable displacement pressure compensated pump which supplies pressurized fluid at an approximately constant pressure to an accumulator 26 which in turns supplies a steering mechanism indicated generally at 15. The steering mechanism 15 includes actuators 12 and 14, a steering valve 24 of known type and cross-connected relief valves 32 and 33.

As shown, the valve 24 is in the neutral position. If it is moved in one direction the steering actuators are operated to extend one and retract the other and steer the vehicle accordingly, while movement of the steering valve 24 in the other direction reverses the action of the actuators, retracting the former and extending the latter in order to steer the vehicle in the opposite direction.

Accumulator 26 is the primary source of pressurized hydraulic fluid for the steering system with the pump 16 in this system being utilized to supply makeup hydraulic fluid to the accumulator as needed. Also, of course, the accumulator 26 provides a source of pressurized hydraulic fluid for emergency operation of the steering system in the event of failure of both pumps or other failure or leakage.

The relief valves 32 and 33 are set to protect the hydraulic steering mechanism from unusually high hydraulic pressures which may be produced by shock loads on the steering actuators 12 and 14.

The pumps 16 and 18 are connected to the accumulator and hydraulic steering mechanism by means of one-way check valves 28 and 30 respectively, arranged to prevent either pump from attempting to drive the other pump. Engine driven pump 16 normally supplies the pressurized hydraulic fluid required by the hydraulic steering system 10, with ground driven pump 18 available to automatically take over the supply of pressurized fluid in the event of a failure or stoppage of pump 16, it being understood that pump 18 operates only when the vehicle is in motion. An unloader valve 34 is provided to direct the fluid output from pump 18 back to reservoir 44 until such time as pump 18 is needed for emergency operation of the steering system.

Figure 2:
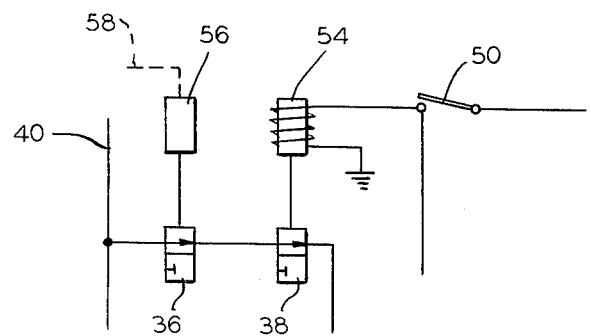
FIG. 2 is a fragmentary view of a portion of FIG. 1 showing the change in position of some elements to render the steering system inoperable.

The hydraulic steering system includes a pair of valves 36 and 38 connected in series between conduit 40 which connects to the accumulator 26 and conduit 42 which discharges into the reservoir 44. During normal operation of the vehicle and its steering system 10 both valves 36 and 38 are closed as indicated in FIG. 1. Under certain conditions both valves open to the position shown in FIG. 2 and this operation is explained below.

As illustrated in FIG. 1, the engine 22 may be a diesel engine having a fuel valve 46 which must be opened in a suitable manner such as by a solenoid 48 in order to enable the engine 22 to operate and propel the vehicle and also operate the pump 16. As shown, solenoid 48 is controlled by switch 50 which may be, for example, a conventional key operated switch. When switch 50 is in the closed position shown in FIG. 1 battery 52 energizes solenoid 48 and opens fuel valve 46 to permit operation of engine 22.

The closing of key switch 50 also energizes solenoid 54 which moves valve 38 to the closed position shown in FIG. 1. When switch 50 is opened to the position shown in FIG. 2 solenoid 54 is deenergized, allowing valve 38 to move to the open position shown in FIG. 2. However, this alone causes no change in pressurization of the steering system because valve 36 is still closed as shown in FIG. 1.

Valve 36 is operated by sensor 56 as indicated by the dash line 58 and sensor 56 is responsive to the residual pressure which appears at the outlet of pump 18 during normal operation when the vehicle is in motion. Pump 18 operates as long as the vehicle is in motion and the sensor 56 is arranged to sense when pump 18 stops, indicating that the vehicle has stopped. When this occurs sensor 56 causes valve 36 to move to the open position illustrated in FIG. 2 of the drawing. When this occurs and valve 38 also is in the open position hydraulic fluid is discharged from accumulator 26 through conduit 40, through valves 36 and 38 and through conduit 42 to reservoir 44, and the steering system is depressurized and thereby inactivated.

It will be appreciated that this invention provides safety features in that as long as the vehicle is moving the steering system remains pressurized and the operator can steer the vehicle in the normal manner even though the engine dies or the operator inadvertently turns the engine off by opening switch 50 before the vehicle has come to a complete stop. However, when the vehicle has stopped and the engine has been turned off the steering system is depressurized and is no longer operable, thus preventing operation of the steering mechanism which could cause injury to persons working on or around the vehicle or property damage.

While we have described and illustrated our invention in the best mode contemplated for carrying it out it will be appreciated that modifications may be made. For example, it will be apparent to one skilled in the art that the invention is not limited to use with a diesel engine but is equally applicable to other prime movers. Moreover, it is not essential that the pump 16 be driven by the engine; it can be driven in another manner, such as by a separate engine or an electric motor operating from the vehicle electrical system. Also, it will be apparent that this invention is adaptable to the use of two pumps which jointly supply fluid to the steering system during normal operation. Accordingly, we intend to cover by the appended claims all modifications and equivalents falling within the true spirit and scope of our invention.

We claim:

1. A steering system for a vehicle having a hydraulic steering mechanism, comprising a ground driven hydraulic pump which operates only when the vehicle is moving, a second hydraulic pump which operates independently of movement of the vehicle, an accumulator, means connecting each of said pumps to supply said accumulator, the accumulator being connected to supply pressurized hydraulic fluid to the steering mechanism, and two valves connected in series and arranged to discharge said accumulator and depressurize the steering system when both said valves are open, means responsive to stoppage of said hydraulic ground driven pump for opening a first one of said valves, and means responsive to stoppage of said second pump for opening the second said valve.

2. A steering system as in claim 1 for a vehicle having an engine, said second hydraulic pump driven by the engine and supply pressurized hydraulic fluid to said accumulator during normal operation, and means including an unloader valve whereby said ground driven pump supplies pressurized fluid to said accumulator when said second pump is not operating.

3. A steering system as in claim 2 in which the said ground driven hydraulic pump is reversible and is connected to supply hydraulic fluid during either direction of movement of the vehicle.

4. A steering system as in claim 3 in which said second valve is solenoid operated and said solenoid operates to move said second valve to the open position when the engine stops.

5. A steering system as in claim 2 in which said second hydraulic pump is a variable displacement, pressure compensated pump.

* * * * *